United States Patent [19]

Kimber et al.

[11] Patent Number: 5,371,837
[45] Date of Patent: Dec. 6, 1994

[54] VIRTUAL PRINTER

[75] Inventors: Charles M. Kimber, Palmdale; Allen E. Russ, Thousand Oaks; Michael L. Steen, Newbury Park, all of Calif.

[73] Assignee: Dataproducts Corporation, Woodland Hills, Calif.

[21] Appl. No.: 216,600

[22] Filed: Mar. 23, 1994

Related U.S. Application Data

[63] Continuation of Ser. No. 993,057, Dec. 18, 1992, abandoned.

[51] Int. Cl.$^5$ .............................................. G06F 15/00
[52] U.S. Cl. ...................................... 395/114; 395/112
[58] Field of Search ........................ 395/112, 114–116, 395/200, 500; 346/154; 400/61, 62, 70, 71, 76; 358/444, 452, 467

[56] References Cited

U.S. PATENT DOCUMENTS

| | | | |
|---|---|---|---|
| 5,047,957 | 9/1991 | Ikenoue | 395/114 |
| 5,050,098 | 9/1991 | Brown, III et al. | 395/112 |
| 5,075,874 | 12/1991 | Steeves et al. | 395/112 |

OTHER PUBLICATIONS

Article entitled "Dataproducts Takes Networking a Step Farther with VPT" from *The Hard Copy Observer*, vol. III, No. 7 (Jul. 1993).
Owners Manual for LaserTools Printer control Panel (Copyright 1991).

*Primary Examiner*—Arthur G. Evans
*Attorney, Agent, or Firm*—Spensley Horn Jubas & Lubitz

[57] ABSTRACT

A work station user selects a desired printer default configuration. Thereupon an address exclusively associated with the selected default configuration is appended to the print data sent from the work station to the printer. Default configuration setting circuitry provided, e.g., in a circuit card installed in the printer receives the address and, via a look-up table, provides instructions for implementing the default configuration associated with the address. The printer is then configured in accordance with the selected default configuration.

39 Claims, 4 Drawing Sheets

VIRTUAL PRINTER

This is a continuation of application Ser. No. 07/993,057 filed on Dec. 18, 1992, now abandoned.

BACKGROUND OF THE INVENTION

1. Field of the Invention

The present invention relates to apparatus and methods for controlling the configuration of a printer and, in particular embodiments, for allowing a user to select a printer default configuration from a plurality of preset default configurations to control a printer connected in a multiple work station network.

2. Description of Related Art

In a typical computer printer, it is necessary to establish a default configuration. Typically, the printer has a default configuration set by the user or preset by the manufacturer. Default configurations comprise sets of instructions for controlling certain parameters of the printing operations performed by the printer, including, but not limited to, fonts, paper sizes, page description languages, finishing options and stackers. Data or instructions for setting the default configuration are typically stored in a memory circuit within the printer.

In a typical network system, e.g., wherein one or more printers are connected, through a network communications link, to a plurality of individual work stations (e.g., personal computer terminals), each printer will have a preset default configuration, as discussed above. Each work station accessing a printer must operate with the default configuration set for that printer. It is often the case in a multiple work station network that the user of one work station will require a printer default configuration different than the printer default configuration required by the user of another work station.

If more than one printer is connected in the network, each printer may have a default configuration different from the default configuration set for the other printers in the network. Any one printer may be selectively accessed by a work station user by selecting that printer's network port. In this regard, by connecting a plurality of printers in the network through a corresponding plurality of network ports, a work station user may select the printer (and, thus, the default configuration set for that printer) to accommodate that user's printing needs.

However, the cost of including multiple printers in a network can be relatively high, especially where a large number of printers (and default configurations) are required. Moreover, the physical capabilities of the work stations or the network communications link may limit the number of printer network ports (and, thus, the number of printers having different default configurations) operable in the network. Thus, there is a need in the industry for an economical system which allows work stations in a network to operate with multiple printer default configurations, e.g., by allowing the work station users to select any one of the multiple printer default configurations.

SUMMARY OF THE DISCLOSURE

In a network, a device typically has a unique communications protocol address for each protocol compatible therewith. In embodiments of the present invention, the print server responds to multiple protocol addresses. Each address to which the print server responds is uniquely associated with a default configuration.

In accordance with one embodiment of the invention, a printer is selectively controlled to operate as any one of a plurality of "Virtual Printers." Each "Virtual Printer" has a default configuration which differs from the default configuration of the other "Virtual Printers." In this regard, a single printer connected in a network through a single printer network interface can be operated in accordance with any one of the plural default configurations.

A work station user selects a desired printer default configuration by selecting a unique communications protocol address associated with that default configuration. By directing the print data to the selected communications protocol address, the printer automatically assumes the default configuration associated with that address. Default configuration setting circuitry provided, e.g., in a circuit card installed in the printer, is programmed to respond to the communications protocol address and, via a look-up table, provide instructions for implementing the default configuration associated with the address. The printer is then configured in accordance with the selected default configuration.

If the same work station user or another work station user desires a different printer default configuration, the new default configuration is selected by that user and print data sent from that work station is directed to the communications protocol address associated with the new default configuration. The default configuration setting circuitry provides instructions for implementing the default configuration associated with the communications protocol address in the manner discussed above, such that the printer is then configured in accordance with the new default configuration.

In this regard, print data for a plurality of printer default configurations can be sent through a single printer network interface to a single printer. The printer can be configured in accordance with any one of the plural default configurations, thus obviating the need to connect a plurality of printers (each having a different default configuration) through a plurality of printer ports in the network. As a result, considerable cost in providing a separate printer for each default configuration can be avoided. In addition, with the reduction in individual printers connected in the network, the number of printer ports needed in the network may be reduced. Other objects, benefits and features of the present invention will be apparent from the following description.

BRIEF DESCRIPTION OF THE DRAWINGS

The detailed description will be made with reference to the accompanying drawings, wherein like numerals designate corresponding parts in the several figures.

DETAILED DESCRIPTION OF PREFERRED EMBODIMENTS

The following detailed description is of the best presently contemplated mode of carrying out the invention. This description is not to be taken in a limiting sense, but is made merely for the purpose of illustrating the general principles of embodiments of the invention. The scope of the invention is best defined by the appended claims.

As discussed above, in one embodiment of the invention, a printer is selectively controlled to operate as any one of a plurality of "Virtual Printers." Each Virtual Printer has a default configuration which differs from the default configuration of the other Virtual Printers. In this regard, a single printer connected in a network through a single printer network interface can be operated in accordance with any one of the plural default configurations.

Figure 1:
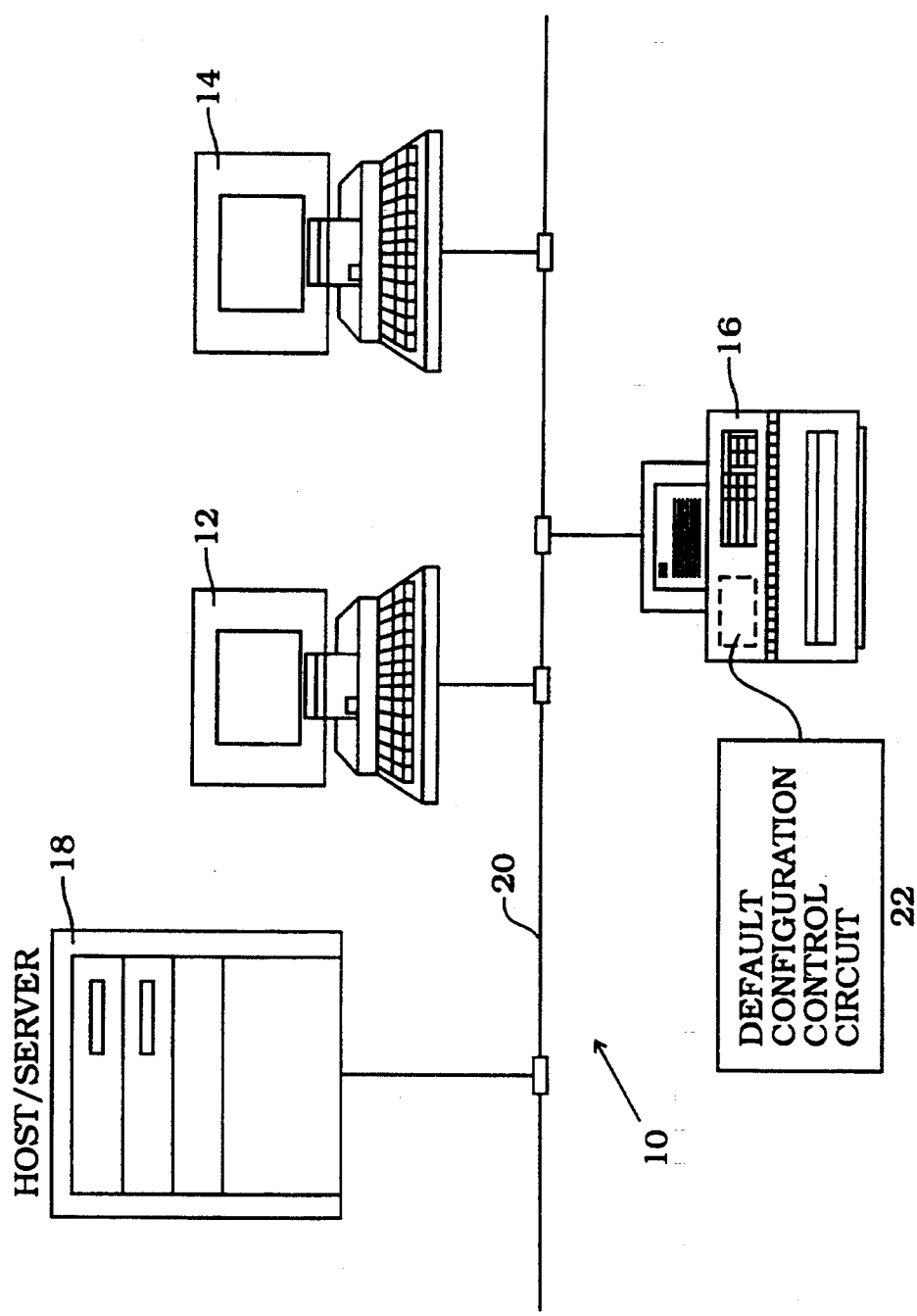
FIG. 1 is a block diagram of a computer network employing an embodiment of the present invention.

FIG. 1 is a block diagram of a computer network 10 in which a number of individual work stations are connected, through a network communications link, to a printer station. The individual work stations, shown at reference numbers 12 and 14, may be, for example, personal computer terminals (PCs). The printer station may comprise, for example, an ink jet printer (with a default configuration control circuit as discussed below) as shown at reference character 16. FIG. 1 also shows a host/server station 18 connected in the network. A network communications link 20 interconnects the above discussed stations 12–18.

The default configuration, with which the printer 16 operates for any given printing job, is controlled by a default configuration control circuit 22. In the illustrated embodiment, the circuit 22 is provided in a circuit card mounted inside of the printer housing. However, it will be understood that, in other embodiments, the circuit 22 may be provided external to the printer housing or otherwise suitably connected between the print engine and the printer network interface.

In response to print Job signals sent from a work station 12 or 14 or from a host server, the circuit 22 selects a set of default configuration instructions from a plurality of sets of such instructions. The selected set of instructions are provided to the general default control circuitry of the printer to set the printer's default configuration. The selection of the particular set of default configuration instructions is controlled by the user's selection of the communications protocol address associated with the default configuration.

The printer 16, with the control circuit 22, has multiple default configurations, each designated as a "Virtual Printer". Circuit 22 could be implemented in hardware and/or software. Each Virtual Printer is associated with a unique communications protocol address. When accessing the printer, the user of the accessing work station, e.g., work station 12, directs the print job to the communications protocol address of the Virtual Printer with the default configuration desired by the user.

As discussed below, upon receiving the print job from work station 12, the circuit 22 recognizes the communications protocol address as being associated with one of the Virtual Printers. The circuit 22 then provides the printer 16 with printer default configuration instructions for the Virtual Printer associated with the communications protocol address. In response to the instructions from circuit 22, the printer 16 is automatically set to the default configuration specified for the Virtual Printer associated with the communications protocol address selected at the work station 12, without manual action on the operator control panel of the printer. With the printer 16 set in accordance with the selected default configuration, the print job from the work station 12 is processed by the printer.

The circuit 22 includes an address processing circuit and a look-up table and associated memory for storing a plurality of default configuration instruction sets with a corresponding plurality of communications protocol addresses. The circuit 22 receives a print data signal from the work station 12 directed to the selected communications protocol address. The circuit 22 processes the communications protocol address and provides the default configuration instruction set corresponding to the communications protocol address in the look-up table, for setting the printer 16 with a particular default configuration (or Virtual Printer). Thus, the work station user can set the physical printer 16 to any one of the plurality of default configurations (Virtual Printers) by selecting the associated communications protocol address and sending the print job signals to that address.

Figure 2:
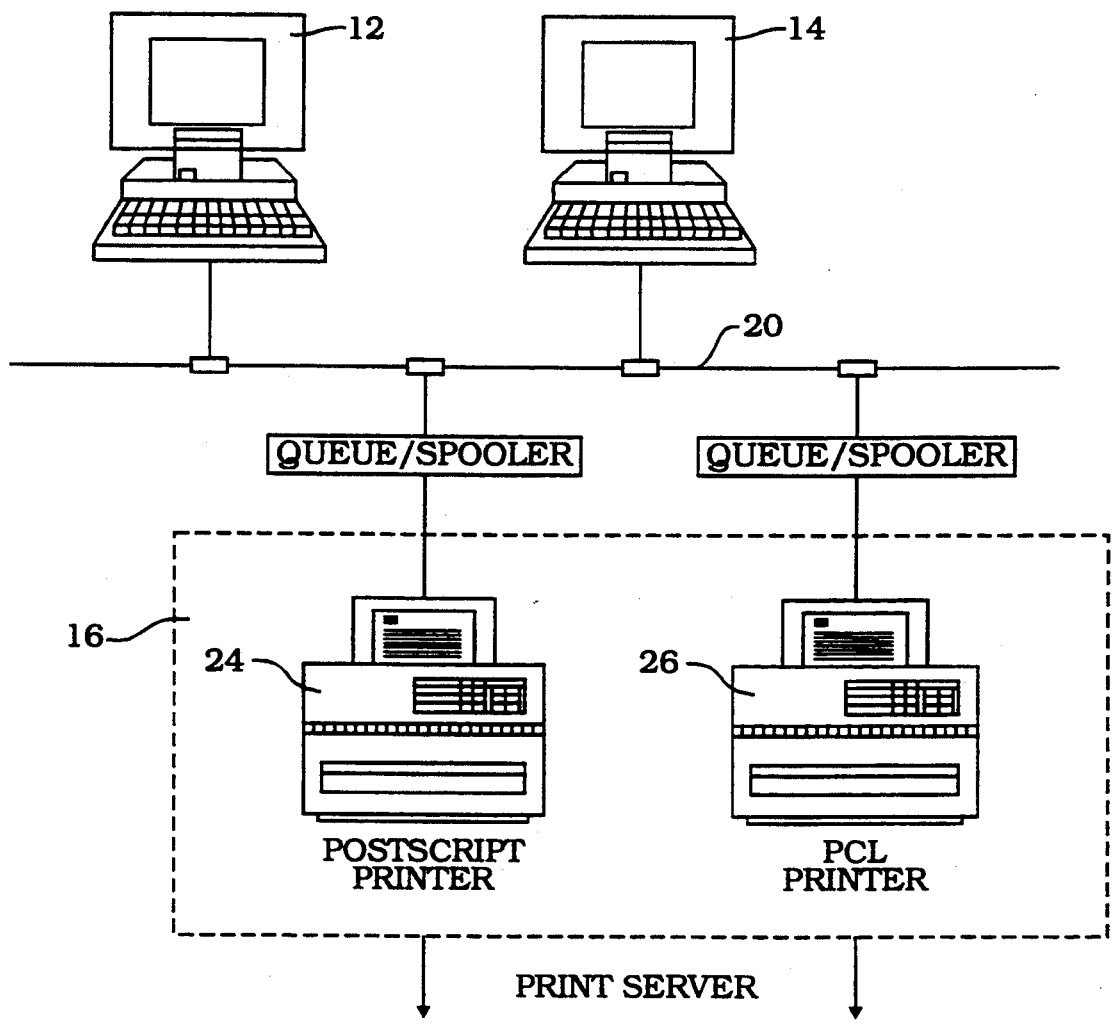
FIG. 2 is a block diagram representing the computer network of FIG. 1, as perceived by a work station user.

In this manner, the physical printer 16 appears to the work station user as a plurality of Virtual Printers, each of which are uniquely addressable. FIG. 2 is a block diagram representing this user perceived arrangement with two Virtual printers 24 and 26. FIG. 2 also shows a "Queue/Spooler" for each Virtual Printer, as perceived by the work station user. The "Queue/Spooler" function may actually be performed by the Host/Server 18 (FIG. 1) or the work station itself.

Figure 3:
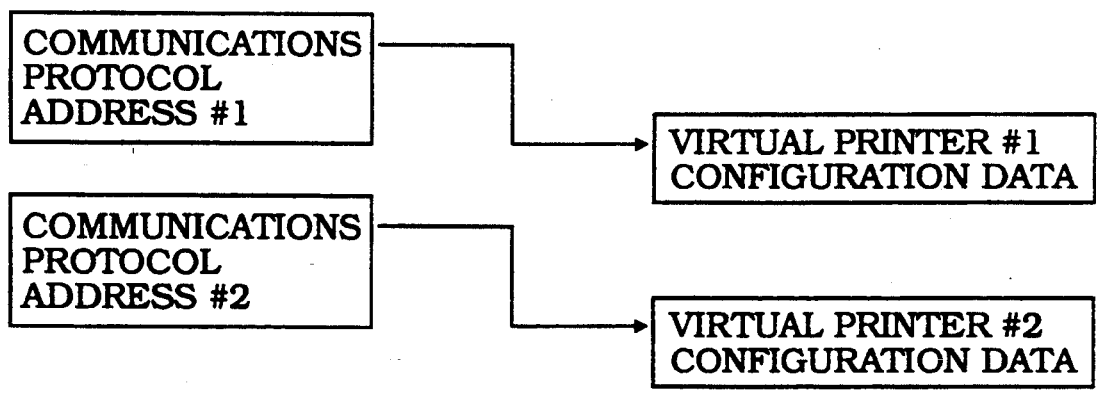
FIG. 3 is a block diagram representing a look-up table of a printer default configuration control circuit indexed by the communications protocol address in accordance with an embodiment of the present invention.

FIG. 3 is a block diagram representing the look-up table for the circuit 22. Each box on the right side of FIG. 3 corresponds to an addressable location of a memory circuit wherein the printer default configuration instructions for a particular Virtual Printer are stored. The communications protocol address provided from the work station is converted into a table index and the virtual printer configuration instructions corresponding to the table index are provided to configure the physical printer 16 for the print job provided by the work station. The memory circuit may be provided as part of the printer's general memory circuit or may be provided as an additional circuit internal or external to the printer housing.

Figure 4:
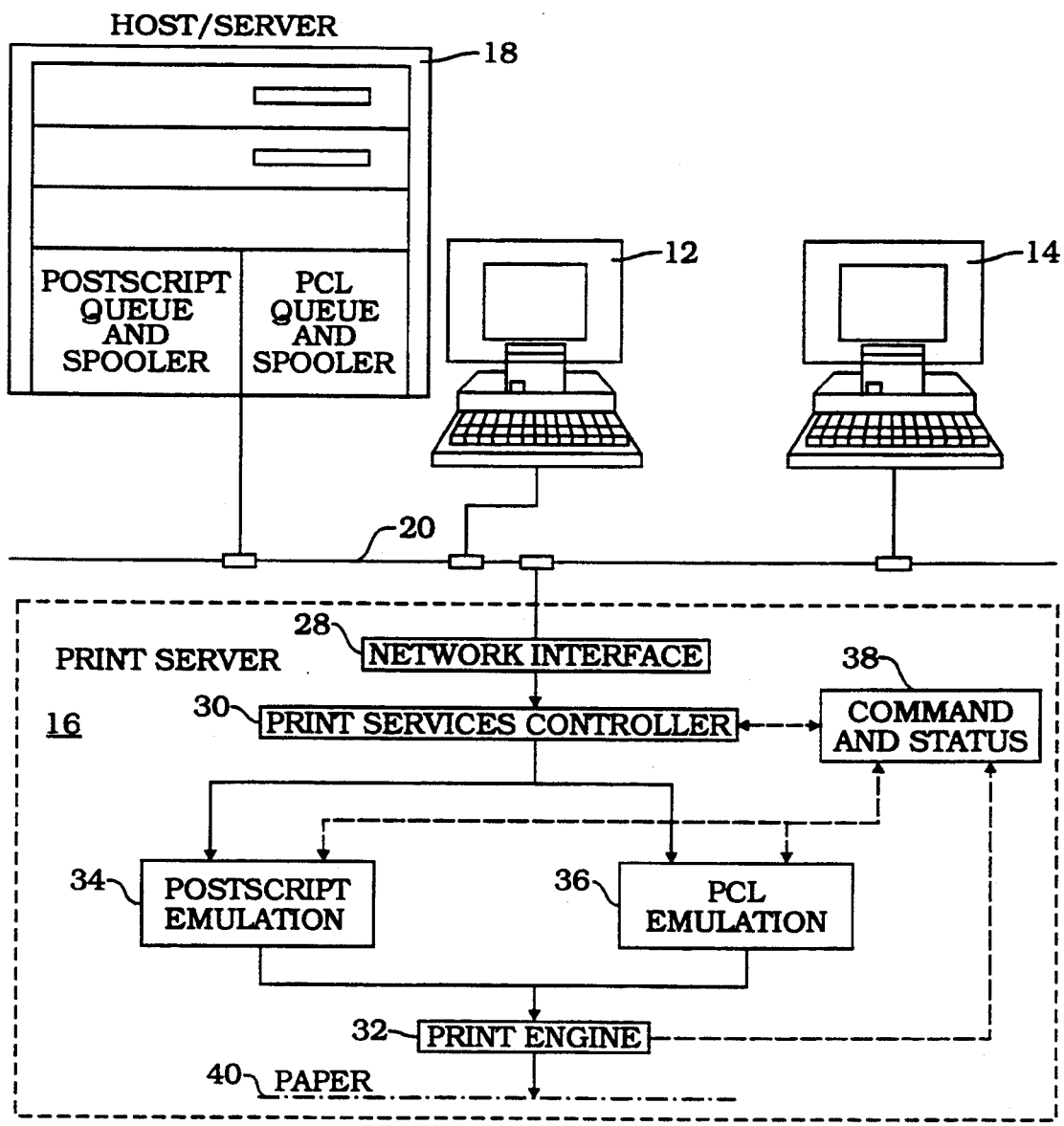
FIG. 4 is a block diagram of the network shown in FIG. 1, with a further representation of internal architecture of the printer shown in FIG. 1.

FIG. 4 is a block diagram of the network shown in FIG. 1, with a further representation of internal architecture of the printer 16 and the printer network interface. The printer network interface 28 connects the rest of the printer with the network communications link 20. A print services controller 30 provides the general processing functions for operating the print engine 32, including monitoring the system for status and for faults, such as the occurrence of low toner or a paper jam. In this embodiment, the processor and look-up table for the printer default configuration control circuit 22 is included in the controller 30. Thus, the printer default configuration control circuit 22 may be provided within the printer's general control circuitry. Alternatively it may be provided, as discussed above, in a circuit card added to the printer's ordinary control circuitry or as an external circuit, external to the printer housing and located after the printer network interface.

FIG. 4 also shows further printer components, including PostScript Emulation and PCL Emulation circuits 34 and 36 and a Command and Status circuit 38. The emulation circuits 34 and 36 function, generally to interpret print job data and provide print engine control signals to the print engine 32. Emulation circuit 34 operates for POSTSCRIPT (trademark) and ADOBE (trademark) type printers and emulation circuit 36 operates for HEWLETT PACKARD (trademark) type printers. Further embodiments may have emulation circuits for other types of printers.

The Command and Status circuit 38 receives signals from the print services controller 30, the emulation circuits 34 and 36 and the print engine 32 and provides control signals to the print services controller and the emulation circuits, e.g., for the fault monitoring functions, etc. The print engine 32 may be, for example a 30 PPM (page-per-minute) print engine. Print engine control signals from the emulators 34 and 36 control the print engine 32 to print on a print medium, such as paper 40.

In operation, a work station user selects a first printer default configuration for a first print job. Thereupon the data for the first print job is sent to the first communications protocol address exclusively associated with the selected default configuration. The work station may be controlled, e.g., by software which provides user prompting indicia on the work station terminal for instructing a user to make a default configuration selection via the work station key board. Alternatively, the work station may be programmed to automatically select a particular default configuration.

Default configuration setting circuitry 22 provided, e.g., in the printer, responds to the first communications protocol address and, via a look-up table, provides instructions for implementing the default configuration associated with the first communications protocol address. The printer is then configured as a first Virtual Printer, in accordance with the selected default configuration.

If a second work station user, or the same work station user, selects a second default configuration for second print job, the print data for the second print job is sent to a second communications protocol address (associated with the second default configuration). The default configuration setting circuitry 22 responds to the second communications protocol address and, via the look-up table, provides instructions for implementing the default configuration associated with the second communications protocol address. The printer is then configured as a second Virtual Printer, in accordance with the second default configuration.

By sending print data for a further print job to the first communications protocol address, the printer default configuration of the first Virtual Printer will be restored for the further print job. In addition to the default configuration for each Virtual Printer, the context (or active configuration) of each Virtual Printer is optionally preserved (e.g., via a memory circuit as discussed above) and may be restored between print jobs. Thus, if, for example, the user of the first work station was using, as an active configuration, a form blank and had printed a completed form using the first Virtual Printer, upon restoring the first Virtual Printer, the user would also restore the form blank. This can be extremely efficient and cost saving in networks wherein a particular context is used over and over by the same or different work station users.

Consider, for example, a computer network in an accounting firm, wherein several accountants are connected, via their individual work stations to a computer network. An accountant may wish to fill out a first form blank (e.g., a tax form 1040A) for one client and a second form blank (e.g., a balance sheet form) for another client. Assuming that the first and second blank forms are implemented by software, e.g., via a template in a word processing software (e.g., WORDPERFECT, a trademark), the accountant first selects the template for the first form blank, fills in the blanks with appropriate information and sends the data as a print job to the first Virtual Printer.

The accountant then selects the template for the second form blank, fills in the blanks with appropriate information and sends the data as a print job to the second Virtual Printer. If, at a later time, the accountant wishes to fill out the first form blank for yet another client, the accountant may access the first Virtual Printer and thereby not only restore the default configuration associated with the first Virtual Printer, but also restore the context of the print job previously sent to the first Virtual Printer, i.e., the form blank for the first form. Additionally, if a second accountant in the network wishes to fill out the second form blank for yet another client, the second accountant may access the second Virtual Printer and thereby restore the default configuration associated with the second Virtual Printer and the second form blank.

While the above example relates to a network in an accounting office, wherein various "contexts" comprise accounting forms, it will be understood that further embodiments of the invention may be configured for other types of office, lab, academic or other applications. Other types of "contexts" may be law forms, letter heads, blank graphs or tables, architectural, engineering or artistic drawings, or the like.

According to embodiments of the invention, multiple simultaneous communications protocols (e.g., LAT, TCP/IP, ETHERTALK (all believed to be trademarks), or the like) may be used and the Virtual Printers will be uniquely addressed in each available protocol. Priorities may be provided, e.g., by the end user, for governing the order in which multiple simultaneous print requests would be processed by the printer.

In further embodiments, the printer would automatically track resources used by each Virtual Printer. Such resources may include, but are not limited to, images printed, physical sheets printed and bytes processed. In response to a command issued by an end user, the printer will provide a report and/or reset the resource statistics for all or a selected number of Virtual Printers. In preferred embodiments, a portion of the memory associated with the look-up table is devoted to this tracking and reporting feature.

The presently disclosed embodiments are to be considered in all respects as illustrative and not restrictive. The scope of the invention being indicated by the appended claims, rather than the foregoing description, and all changes which come within the meaning and range of equivalency of the claims are, therefore, intended to be embraced therein.

What is claimed is:

1. A method of setting a printer default configuration for a printer, the method comprising the steps of:
   providing print job data;
   directing the print job data to an address associated with a printer default configuration;
   setting a printer in accordance with the default configuration associated with the address, in response to the direction of print job data to the address; and operating the printer in accordance with the print job data and the default configuration associated with the address;

wherein the step of setting the printer comprises the steps of:

associating, in a look-up table, the address with a stored set of printer default configuration instructions; and setting the printer in accordance with the set of printer default configuration instructions associated with the address.

2. A method of setting a printer default configuration for a printer, the method comprising the steps of:

providing print job data;

directing the print job data to an address associated with a printer default configuration;

setting a printer in accordance with the default configuration associated with the address, in response to the direction of print job data to the address; and operating the printer in accordance with the print job data and the default configuration associated with the address;

wherein the step of directing the print job data comprises the step of transmitting a signal to the printer, the signal having a first component corresponding to the print job data and a second component corresponding to the selected address.

3. A method of setting the printer default configuration of a printer linked to a first data transmission station, the method comprising the steps of:

(a) providing a look-up table and associated memory for a plurality of communications protocol addresses and a corresponding plurality of printer default configuration control instructions, wherein each communications protocol address is uniquely associated with a respective set of printer default configuration control instructions stored in the memory;

(b) selecting a first communications protocol address with the first data transmission station;

(c) directing a data signal for a first print job from the first data transmission station to the first communications protocol address;

(d) setting the default configuration of the printer in accordance with the printer default configuration control instructions associated in the look-up table with the first communications protocol address; and (e) operating the printer in accordance with the first print job data and the default configuration associated with the first communications protocol address.

4. A method as recited in claim 3, wherein a second data transmission station is linked to the printer, the method further comprising:

(f) selecting a second communications protocol address with the second data transmission station;

(g) directing a data signal for a second print job from the second data transmission station to the second communications protocol address; and following step (e):

(h) setting the default configuration of the printer in accordance with the printer default configuration control instructions associated in the look-up table with the second communications protocol address; and (i) operating the printer in accordance with the second print job data and the default configuration associated with the first communications protocol address.

5. A method as recited in claim 4, wherein:

the step of directing a data signal for the first print job comprises the steps of appending a signal corresponding to the first communications protocol address to the data signal; and transmitting the first print job data signal and appended address signal to the printer; and the step of directing a data signal for the second print job comprises the steps of appending a signal corresponding to the second communications protocol address to the data signal; and transmitting the second print job data signal and appended address signal to the printer.

6. A method as recited in claim 3, wherein the step of directing a data signal for the first print job comprises the steps of:

appending a signal corresponding to the first communications protocol address to the data signal; and transmitting the first print job data signal and appended address signal to the printer.

7. A method as recited in claim 3, wherein a second data transmission station is linked to the printer, the method further comprising:

(f) selecting a second communications protocol address with the second data transmission station;

(g) directing a data signal for a second print job from the second data transmission station to the second communications protocol address; and (h) associating a respective priority with the first and second communications protocol addresses;

(i) determining which of the first and second communications protocol addresses has higher priority;

(j) setting the default configuration of the printer in accordance with the printer default configuration control instructions associated in the look-up table with the higher priority communications protocol address;

(k) operating the printer in accordance with the default configuration associated with the higher priority communications protocol address and in accordance with the print job data from the data transmission station with which the higher priority communications protocol address was selected.

8. A method as recited in claim 7, wherein, after step (k), the method further comprises the steps of:

(l) setting the default configuration of the printer in accordance with the printer default configuration control instructions associated in the look-up table with the lower priority communications protocol address;

(m) operating the printer in accordance with the default configuration associated with the lower priority communications protocol address having and in accordance with the print job data from the user work station with which the lower priority communications protocol address was selected.

9. A method as recited in claim 4, further comprising the step of recording the amount of print units printed with the default configuration of the printer set in accordance with the printer default configuration control instructions associated with each of the first and second communications protocol address.

10. A method as recited in claim 4, wherein the step of recording comprises recording at least one of the number of sheets printed, the number of bytes processed and the amount of image printed.

11. Apparatus for setting the default configuration of a printer, the apparatus comprising:
   an electronic circuit having a look-up table and associated memory for a plurality of communications protocol addresses and a corresponding plurality of printer default configuration control instructions, wherein each communications protocol address is uniquely associated in the look-up table with a respective set of printer default configuration control instructions stored in the memory;
   a data transmission station having means for providing a data signal for a print job;
   transmission means for transmitting the print job data signal to the selected address; and
   default control means for setting the printer in accordance with the default configuration associated with the address.

12. In a network having at least one user work station and at least one printer station coupled to the user work station by a communications network link, the printer station including a printer responsive to a set of default configuration control instructions for setting the printer's default configuration, the improvement comprising apparatus for controlling the printer's default configuration including:
   look-up table and associated memory circuitry, coupled to the network communications link, for a plurality of communications protocol addresses and a corresponding plurality of printer default configuration control instructions, wherein each communications protocol address is uniquely associated in the look-up table with a respective set of printer default configuration control instructions stored in the memory;
   means, associated with the at least one user work station, for selecting a communications protocol address and transmitting a signal corresponding to print data to the selected communications protocol address, through the network communications link; and
   means, associated with the look-up table circuitry, for providing the set of printer default configuration control instructions associated in the look-up table with the communications protocol address to which the print data signal is sent, for setting the printer's default configuration.

13. Apparatus as recited in claim 12, further comprising
   means for storing print job context for each printer default configuration; and
   means for recalling the print job context stored for a printer default configuration upon setting the printer with the printer default configuration.

14. Apparatus as recited in claim 13, wherein the print job context comprises print data corresponding to a blank form.

15. Apparatus as recited in claim 12, further comprising means for recording the amount of print units printed with the default configuration of the printer set in accordance with each respective set of printer default configuration control instructions included in the look-up table.

16. Apparatus as recited in claim 15, wherein the print units comprise at least one of the number of sheets printed, the number of bytes processed and the amount of page images printed.

17. Apparatus as recited in claim 11, further comprising means for recording first and second printing amount values, the first printing amount value corresponding to the amount of print units printed with the default configuration of the printer set in accordance with the set of printer default configuration control instruction associated with a first communications protocol address and the second printing amount value corresponding to the amount of print units printed with the default configuration of the printer set in accordance with the set of printer default configuration control instruction associated with a second communications protocol address.

18. A method as recited in claim 3, further comprising the steps of:
   storing print job context data for a stored set of printer default configuration instructions; and
   recalling stored print job context data upon setting the printer in accordance with the set of printer default configuration instructions for which the print job context is stored.

19. Apparatus as recited in claim 12, further comprising means for recording multiple values, each respective value corresponding to the amount of print units printed with the default configuration of the printer set in accordance with a respective one of the sets of printer default configuration control instructions included in the look-up table.

20. A network comprising:
   a communications network link;
   a first data transmission station for transmitting first print job data on the communications network link to a first communications protocol address;
   a second data transmission station for transmitting second print job data on the communications network link to a second communications protocol address;
   at least one printer station coupled to the communications network link for receiving the first and second print job data, the printer station including a printer responsive to a set of configuration control instructions for setting the printer's configuration;
   table and associated memory circuitry for a plurality of communications protocol addresses and a corresponding plurality of printer configuration control instructions, wherein each communications protocol address, including each of the first and second communications protocol addresses, is associated in the table with a respective set of printer configuration control instructions stored in the memory;
   said table and associated memory circuitry coupled to the network communications link, for providing the set of printer configuration control instructions associated in the table with the first communications protocol address, to set the printer's configuration for the first print job data, and for providing the set of printer configuration control instructions associated in the table with the second communications protocol address, to set the printer's configuration for the second print job data.

21. Apparatus as recited in claim 20, further comprising context data storage circuitry associated with the table and associated memory circuitry, for storing a print job context for the printer configuration associated in the table with the first communications protocol address and for recalling a stored print job context upon setting the printer with the printer configuration associated in the table with the first communications protocol address.

22. Apparatus as recited in claim 21, wherein the print job context comprises print data corresponding to a blank form.

23. Apparatus as recited in claim 20, further comprising means for recording the amount of print units printed with the configuration of the printer set in accordance with each respective set of printer configuration control instructions included in the table.

24. Apparatus as recited in claim 23, wherein the print units comprise at least one of the number of sheets printed, the number of bytes processed and the amount of page images printed.

25. Apparatus for setting the configuration of a printer coupled to a network having a plurality of data transmission stations, each data transmission station capable of directing a print job data signal to a communications protocol address different from the communication protocol address to which print job data signal from at least one other data transmission station is transmitted, the apparatus comprising:

a network communications link circuit responsive to a plurality of communications protocol addresses, for receiving print job data directed to any one of the plurality of communications protocol addresses;

a table and associated memory circuit for relating a plurality of communications protocol addresses to a corresponding plurality of printer configuration control instructions, wherein each communications protocol address is associated in the table with a respective set of printer control instructions stored in the memory, the table and associated memory circuit being operatively coupled to the network communications link circuit, to provide a set of printer configuration control instructions associated in the table with the communications protocol address to which each print job data received by the network communications link circuit is directed.

26. Apparatus as recited in claim 25, further comprising context data storage circuitry associated with the table and associated memory circuitry, for storing a print job context for the printer configuration associated in the table with one of said communications protocol addresses and for recalling a stored print job context upon setting the printer with the printer configuration associated in the table with said one communications protocol address.

27. Apparatus as recited in claim 26, wherein the print job context comprises print data corresponding to a blank form.

28. Apparatus as recited in claim 25, further comprising means for recording multiple printing amount values, each respective printing amount value corresponding to the amount of print units printed with the printer operating in accordance with a respective printer configuration.

29. Apparatus as recited in claim 28, wherein the print units comprise at least one of the number of sheets printed, the number of bytes processed and the amount of page images printed.

30. Apparatus as recited in claim 25, further comprising priority means for associating a respective priority with each respective communications protocol address and for controlling the table and associated memory circuit to provide sets of printer configuration control instructions in a chronological order, the chronological order being dependent upon the priorities associated with the communications protocol addresses that are associated in the table with the printer configuration control instructions provided by the priority means.

31. Printing apparatus operable to be coupled to a network having a plurality of data transmission stations, each data transmission station capable of directing a print job data signal to a communications protocol address different from the communication protocol address to which print job data signal from at least one other data transmission station is transmitted, the printing apparatus comprising:

a printer operable according to printer configuration control instructions for printing data corresponding to print job data signals;

a network communications link circuit responsive to a plurality of communications protocol addresses, for receiving print job data directed to any one of the plurality of communications protocol addresses;

a table and associated memory circuit for relating a plurality of communications protocol addresses to a corresponding plurality of printer configuration control instructions, wherein each communications protocol address is associated in the table with a respective set of printer control instructions stored in the memory, the table and associated memory circuit being operatively coupled to the network communications link circuit and the printer, to provide the printer with a set of printer configuration control instructions associated in the table with the communications protocol address to which each print job data received by the network communications link circuit is directed.

32. Apparatus as recited in claim 31, further comprising context data storage circuitry associated with the table and associated memory circuitry, for storing a print job context for the printer configuration associated in the table with one of said communications protocol addresses and for recalling a stored print job context upon providing the printer with the printer configuration associated in the table with said one communications protocol address.

33. Apparatus as recited in claim 32, wherein the print job context comprises print data corresponding to a blank form.

34. Apparatus as recited in claim 31, further comprising means for recording multiple printing amount values, each respective printing amount value corresponding to the amount of print units printed with the printer operating in accordance with a respective printer configuration.

35. Apparatus as recited in claim 34, wherein the print units comprise at least one of the number of sheets printed, the number of bytes processed and the amount of page images printed.

36. Apparatus as recited in claim 31, further comprising priority means for associating a respective priority with each respective communications protocol address and for controlling the table and associated memory circuit to provide sets of printer configuration control instructions in a chronological order, the chronological order being dependent upon the priorities associated with the communications protocol addresses that are associated in the table with the printer configuration control instructions provided by the priority means.

37. Apparatus for setting a printer configuration for a printer in accordance with print job data directed to a communications protocol address associated with the printer, the apparatus comprising:

printer setting means for associating the communications protocol address to which the print job data is directed with a printer configuration and for setting the printer in accordance with the configuration associated with the communications protocol address, in response to the direction of print job data to the communications protocol address; and printer operating means for operating the printer in accordance with the print job data and the configuration associated with the communications protocol address;

wherein the printer setting means comprises a table and associated memory circuit for relating a plurality of communications protocol addresses to a corresponding plurality of printer configuration control instructions, wherein each communications protocol address is associated in the table with a respective set of printer control instructions stored in the memory, the table and associated memory circuit being operatively coupled to the printer, to provide the printer with a set of printer configuration control instructions associated in the table with the communications protocol address to which the print job data is directed.

38. A network comprising:

a communications network link;

first and second data transmission stations, each coupled to the communications network link, for transmitting print job data over the communications network link to first and second communications protocol addresses, respectively;

a printer station coupled to the communications network link, responsive to print job data transmitted by said first and second data transmission stations over the communications network link to said first and second protocol addresses, respectively, and supporting at least a first and a second printer configuration, said printer station comprising a controller: (a) for setting the printer station to said first printer configuration in response to print job data received from said first data transmission station over the communications network link to said first protocol address, and (b) for setting the printer station to said second printer configuration in response to print job data received from said second data transmission station over the communications network link to said second protocol address.

39. Apparatus for setting a printer configuration for a printer in accordance with print job data directed to a communications protocol address associated with the printer, the apparatus comprising a controller for associating the communications protocol address to which the print job data is directed with a printer configuration and for setting the printer in accordance with the configuration associated with the communications protocol address, in response to the direction of print job data to the communications protocol address, wherein the controller comprises a table and associated memory circuit for relating a plurality of communications protocol addresses to a corresponding plurality of printer configuration control instructions, wherein each communications protocol address is associated in the table with a respective set of printer control instructions stored in the memory, the table and associated memory circuit being operatively coupled to the printer, to provide the printer with a set of printer configuration control instructions associated in the table with the communications protocol address to which the print job data is directed.

* * * * *